US007237250B2

(12) United States Patent
Kanojia et al.

(10) Patent No.: US 7,237,250 B2
(45) Date of Patent: Jun. 26, 2007

(54) PROMOTION SERVER USING VIDEO ON DEMAND CHANNEL

(75) Inventors: Chaitanya Kanojia, Newton, MA (US); Terri Swartz, Marlboro, MA (US); Darren Wetzel, Boston, MA (US); Mark Fagnani, Watertown, MA (US)

(73) Assignee: Navic Systems, Inc., Needham, MA (US)

( * ) Notice: Subject to any disclaimer, the term of this patent is extended or adjusted under 35 U.S.C. 154(b) by 908 days.

(21) Appl. No.: 10/003,079

(22) Filed: Nov. 2, 2001

(65) Prior Publication Data
US 2002/0066106 A1 May 30, 2002

Related U.S. Application Data

(60) Provisional application No. 60/253,350, filed on Nov. 28, 2000.

(51) Int. Cl.
*H04N 7/10* (2006.01)
(52) U.S. Cl. ............................ 725/36; 725/32; 725/34; 725/35; 725/9; 725/22; 725/114; 725/116; 725/118; 725/138; 725/144; 725/146; 725/148
(58) Field of Classification Search ................ 725/32, 725/34–36, 9, 22, 114, 116, 118, 138, 144, 725/146, 148
See application file for complete search history.

(56) References Cited

U.S. PATENT DOCUMENTS 4,331,974 A 5/1982 Cogswell et al. ............. 358/86

(Continued)

FOREIGN PATENT DOCUMENTS

EP 1 071 287 A2 1/2001

(Continued)

*Primary Examiner*—Jason Salce
(74) *Attorney, Agent, or Firm*—Hamilton, Brook, Smith & Reynolds, P.C.

(57) ABSTRACT

Idle Video-On-Demand (VOD) channel capacity is used to deliver promotional content to selected set-top boxes (STBs) in a cable television network. Commercial segment cues are used to instruct a set-top box to switch away from a broadcast program to the VOD channel during a commercial segment, and then switch back again to the original broadcast program at the end of the segment.

More particularly, a promotion server determines an asset to be distributed such as a targeted promotion item (e.g., a commercial), and a list of STBs that are to receive it. The promotion server causes the video promotion content to be stored in VOD servers located at the head ends. A scheduler process then delivers schedule messages to head end message servers which identify each promotion asset, and an STB which is to receive it. The head end message server notifies its associated VOD server which then cues the asset by loading the asset, starting the asset, but pausing it. Prior to the occurrence of a commercial slot in a broadcast program, an asset trigger is inserted into the broadcast stream at the head end. This asset trigger contains general information concerning the asset to be sent, and an idle VOD channel number. The STB receives the asset trigger and readies itself to tune to the VOD channel when cued for at the beginning of a commercial segment, but does not yet tune to the VOD channel. Upon detection of a commercial cue tone in the broadcast channel, the head end message server sends a tune away trigger to the STB, and also instructs the VOD server to start playing the cued promotion. When the STB receives a tune away trigger, it switches from the broadcast channel being played to the selected idle VOD channel, and the promotion is viewed.

3 Claims, 3 Drawing Sheets

U.S. PATENT DOCUMENTS

| | | |
|---|---|---|
| 4,814,883 A | 3/1989 | Perine et al. |
| RE33,808 E | 1/1992 | Wright, Jr. .................... 358/86 |
| 5,155,591 A | 10/1992 | Wachob ........................ 358/86 |
| 5,389,964 A | 2/1995 | Oberle et al. ................... 348/9 |
| 5,446,919 A * | 8/1995 | Wilkins ........................ 725/35 |
| 5,490,060 A | 2/1996 | Malec et al. ................. 364/401 |
| 5,515,098 A | 5/1996 | Carles ........................... 348/8 |
| 5,532,735 A | 7/1996 | Blahut et al. |
| 5,559,549 A | 9/1996 | Hendricks et al. .............. 348/6 |
| 5,600,366 A * | 2/1997 | Schulman ..................... 725/36 |
| 5,774,170 A | 6/1998 | Hite et al. ...................... 348/9 |
| 5,786,845 A * | 7/1998 | Tsuria ......................... 725/32 |
| 6,002,393 A | 12/1999 | Hite et al. .................. 345/327 |
| 6,029,045 A | 2/2000 | Picco et al. .................. 455/5.1 |

FOREIGN PATENT DOCUMENTS

| | | |
|---|---|---|
| WO | WO 99/52285 | 10/1999 |

* cited by examiner

PROMOTION SERVER USING VIDEO ON DEMAND CHANNEL

RELATED APPLICATION(S)

This application claims the benefit of U.S. Provisional Application No. 60/253,350 filed on Nov. 28, 2000, the entire teachings of which are incorporated herein by reference.

BACKGROUND OF THE INVENTION

This invention relates generally to broadcast systems such as cable television networks and more particularly to a technique for coordinating the insertion of specific video content, including targeted commercial or other promotional video content, over idle video-on-demand channels.

For many years it has been realized that cable television (CATV) systems provide numerous advantages as compared to over-the-air broadcast systems. First, these cable systems were valued for their ability to provide for reception of signals in remote rural locations, or where radio signals may be blocked, such as in dense high rise apartment buildings. Later, it was realized that by incorporating long distance communications equipment, such as orbital satellite transponder equipment, centralized distribution networks could be built that not only could route local channels more reliably, but also distribute program content on a nationwide basis. This gave rise to broadcast program content which is available strictly for the cable television subscriber, and the now widely familiar movie, news, weather, music, childrens, sports, family and other program-gendre-specific cable channels.

The present trend is towards a model where the reception devices in the home will include embedded computer systems designed for a particular function or purpose. Today, for example, set-top boxes typically have limited data communication capabilities. The main function of these devices is to handle channel access between residential users and a head end or server on the cable TV network. For example, these systems are typically deployed to offer certain types of premium services, such as video-on-demand. This service allows a viewer to use a menu system to select from a variety of typically pre-recorded premium programs that may be available, such as movies or sporting events. The selected program content is then immediately delivered to the viewer over channels dedicated to delivery of the video-on-demand content.

In the future, the functionality offered by these set-top boxes or other embedded platforms will be expanded even further. For example, they may offer Internet browsing capabilities and e-commerce serving capabilities. Moreover, it is anticipated that common-household appliances will also have computer network functionality, in which case the set-top boxes may be used to remotely control and automate various tasks in the home.

Indeed, millions of digital set-top boxes have already been deployed in the United States. It is estimated that the worldwide market for Internet appliances such as digital set-top boxes and other Internet-connected terminals will reach $17.8 billion in 2004. Increasingly, advertisers and content providers therefore view the cable set-top as the first platform of choice for widespread delivery of a suite of intelligent content management and distribution services.

SUMMARY OF THE INVENTION

The present invention is a system for delivery of targeted content such as promotional video content to a cable television viewer, where the specific content is under control of the a central operator and the viewer is not necessarily aware of the targeted nature of the content.

Consider that the digital set-top box provides interesting functionalities, including the ability to collect data such as a log of the channels watched over time. The set top box can thus be designed to report this information to a central location. At the central location, this data can be aggregated for many hundreds of thousands of users. This information, when coupled with other information, such as viewer demographics, can then be used by advertisers to blanket defined market segments with promotional content. The delivery of promotions to specific target segments can thus allow for impulse responses yielding immediate increases in product revenues.

However, a nationwide cable television network may have hundreds of thousands, if not millions of set-top boxes, each tuned to a different channel. An efficient scheme for routing the targeted content to specific set-top boxes is therefore not as straightforward as it might appear at first glance.

Some have proposed systems in which the targeted content is digitized and sent to the set-top boxes in compressed form, well prior to its display. However, even a single promotion may require several hundred megabytes of storage. These techniques therefore require each set-top box to have a fairly large storage capacity, the cost of which might be prohibitive. And if such a distribution network were built using strictly standard data network protocols such as TCP/IP, the sheer number of require connections could overload a central data servers and routers.

The present invention seeks to overcome these limitations by making use of idle video-on-demand channel capacity to deliver promotional content to selected set-top boxes in the network. The set-top boxes are then enabled to switch away during a commercial segment from the broadcast program to the available video-on-demand channel. The set-top boxes then switch back to the previously selected broadcast program at the end of the segment.

More specifically, a network configured in accordance with the invention includes a promotion server, a scheduler process, and a message router located and/or controlled at a central location, head end locations that include message servers, VOD servers, and trigger insertion equipment, and set-top boxes (STBs) located at subscriber premises that include at least a message client process and a promotion agent process.

The promotion server determines an asset to be distributed such as a targeted promotion item (e.g., a commercial), and a list of STBs that are to receive it. The promotion server causes the video promotion to be sent to a VOD service so that it is available at the VOD servers at the hea ends.

The scheduler process then delivers schedule messages to the head end message servers which identify the promotion and an STB which is to receive it. Receipt of a schedule message by the head end message server causes its associated VOD server to cue the asset by loading the asset, and starting the asset, but pausing it so that the asset does not yet play.

Prior to the occurrence of a commercial slot in a broadcast program, an asset trigger is inserted into the broadcast stream at the head end. This asset trigger contains general information concerning the asset to be sent, and a VOD channel number. The STB receives the asset trigger and readies itself to tune to the VOD channel when it detects a commercial begin cue tone.

Upon detection of a commercial begin cue tone in the broadcast channel, the head end message server sends a tune away trigger to the STB, and also instructs the VOD server to start playing the cued promotion. When the STB receives the tune away trigger, it switches from the broadcast channel being played to the selected VOD channel, and the promotion is viewed.

When a commercial end cue is detected in the broadcast channel, the head end message server instructs the STB to tune back be sending a tune back trigger. The tune back trigger causes the STB to return to the broadcast channel that was being watched prior to delivery of the promotion.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

1. The Promotion Delivery System Generally

Figure 1A:
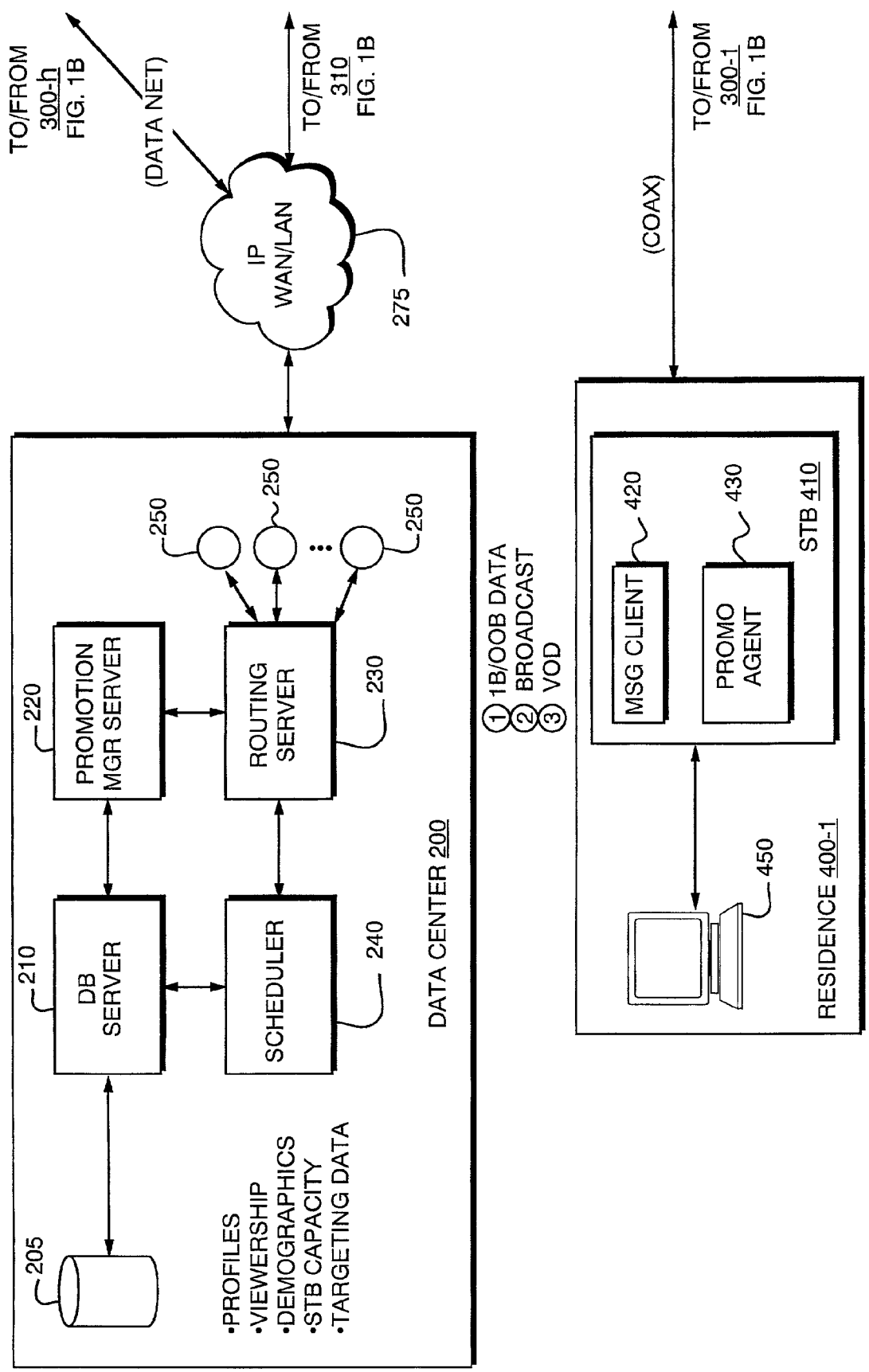
FIGS. 1A and 1B are a block diagram of a network in which promotion is delivered using a video-on-demand channel according to the invention.
Figure 1B:
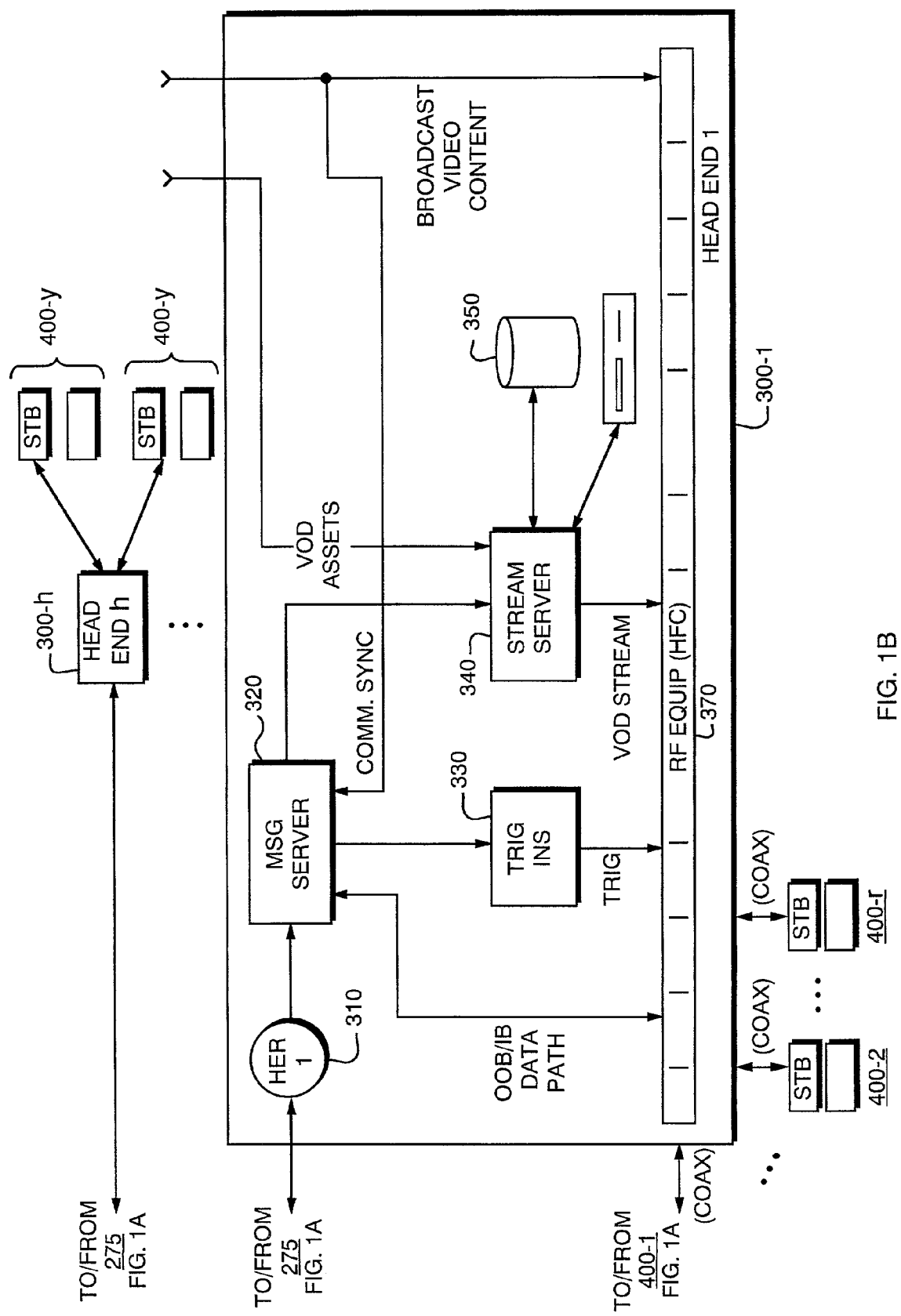

Turning attention now to the drawings, FIGS. 1A and 1B illustrate a multimedia content delivery system which delivers promotions using a video-on-demand channel according to one embodiment of the present invention. The content delivery system may be any type of Cable Television (CATV) network system which may include any type of Hybrid Fiber Coax (HFC) physical cabling, or satellite equipment, or even digital video content distribution systems based on Digital Subscriber Line (DSL) or broadband wireless technologies such as Microwave Distribution Services (MMDS).

The system includes a data center having a promotion server subsystem 200 at which the promotion delivery process originates, and a cable signal distribution network, including head end locations 300-1, . . . , 300-h for routing the promotions to a large number of network devices or set top boxes (STBs) 410 located at individual residences and other cable system subscriber locations 400-1, 400-2, . . . , 400-r, . . . , 200-x, 400-y, where respective video displays 450 are located. The promotions include promotional content that may be presented in various multimedia formats including compressed digital formats (MPEG 2 and 4), or praghical images compressed and uncompressed using standard formats such as JPEG, GIF or BMP. Promotions are used to advertise goods and services, promote events, or present other commercial or non-commercial information.

The promotion server subsystem 200 located at the data center communicates with a promotion agent subsystem 430 embedded within each of the STBs 410. The promotion server subsystem 200 and the promotion agent subsystems 430 may communicate with each other through the routing server 230, data network 275, head end router 310, head end message server 320, and message clients 420 by using a combination of application-level messaging and serialized bulk data transmissions.

In more detail, the promotion server subsystem 200 includes a database server 210, a promotion manager server 220, a message routing server 230, a promotion scheduler 240, and a bank of message routers 250. These components are typically located at a central location in the multimedia network such as at a data center or head end, or divided between the two depending on the density and population of STB devices 410.

The routers 250 communicate with the hea ends 300 through a data network 275. The data network 275 may be a local area network, but depending upon the geographic dispersion of the head ends 300, may itself include a wide area network having a further hierarchy of routers and bulk servers (not shown in FIGS. 1A and 1B). Ultimately, each of the STB devices 410 is reachable through the data network 275 via an associated head end 300. In a typical cable television network, there may be many thousands of network devices 410 connected to a particular head end 300, and there may be many thousands of head ends 300.

Each head end 300 includes a number of devices and processes including a head end message server 320, a trigger inserter 330, a Video-on-Demand/Multimedia (VOD/media) streaming server 340 and associated storage device 350, and RF distribution equipment 370, which distributes broadcast video channels from a video distribution network (not shown).

The head end router 310 sends and receives data messages to and from the promotion server subsystem 200, routing them to and from the head end message server 320.

The head end message server 320 receives schedule messages indicating the schedule of promotions for particular STBs 410 connected to its respective head end 300-1. The hea end message server also transmits and receives messages to the STBs 410 using an Out-of-Band (OOB), In-Band (IB), or broadcast trigger path over the cable network. The signalling used for data communication may be narrowband Quadrature Phase Shift Keying (QPSK), or if high bandwidths are needs, may be Quadrature Amplitude Modulation (QAM).

Upon the occurrence of certain events, the head end message server 320 also uses the trigger inserter 330 to insert trigger signals into the RF cable channel signals generated by the RF equipment 370. The use of trigger signals is an additional expedient communication path for critical cuing events.

The VOD/media server 340 is connected to receive and store VOD content from a VOD distribution network (not shown) provide VOD channels to the RF equipment. It should be understood that the VOD content, which typically includes premium programs such as movies or sporting events, in this instance also include promotions. The VOD content can be stored in recorded form. If it originates in analog form, it is typically stored in a compressed digital format.

At least three signal paths are there present between the head end 300 and the STBs 410, including a bi-directional data path for data messages, a broadcast video stream including data in the VBI spectrum or "stuffed" into the private data segments of an MPEG stream, and a video-on-demand stream.

To determine how to deliver targeted promotions to the network devices, the promotion server subsystem 200 generates viewership profiles for each of the STBs 410 from data collected using a variety of statistical models. The viewership profiles are then used to associate groups of STBs 410 with a particular given target promotion.

More particularly, the promotion server subsystem 200 periodically collects viewer usage data from the promotion agent subsystem 430 located in each of the STBs 410 to generate viewership profiles. In television networks, the data collected by the promotion server subsystem 200 may include tuner data (i.e., a history of channels watched) and responses to past promotions. This history is kept on a relatively fine time scale, such as five seconds. In this way, it can be determined how long a particular promotion was deployed, or even which portions of a promotion or video program were viewed.

The so-called promotion groups are thus collections of STB devices 410 whose individual viewership profiles match membership criterion describing a particular demographic or viewership history. For example, a promotion group may be demographically based, i.e., "married women in their 30's with more than one school age child and a household income of at least $100,0000," or based on viewership history, i.e., "tends to watch the Golf Channel on Sunday afternoon." Therefore, the promotion delivery system 200 is adaptable to changes in viewer usage or viewership patterns by making adjustments to promotion groups. The process for creation and selection of promotion groups is described in more detail in the U.S. Provisional Patent Application Serial No. 60/253,488 filed Nov. 28, 2000, entitled "Using Viewership Profiles for Targeted Promotion Deployment" which is hereby incorporated by reference in its entirety.

Promotions are then scheduled for delivery to promotion groups of specific STBs 410 which may not all be connected to the same head end 300. A promotion is scheduled for delivery to a promotion group by an advertiser or service provider entering a scheduling request for a promotion such as via the promotion manager 220. The promotion manager server 220 packages the promotion for delivery and by storing a record of it in the database server 210, and notifying a video-on-demand service (not shown) that the promotion content will be needed at the VOD server 340 locations at the head ends 300. Typically, broadcast VOD content, such as movies, is more likely distributed using Digital Audio Tape (DAT) which is sent by courier to the various head end locations.

However, if a wide area data network is in place between the head end locations and the central location, the promotion assets can be distributed to the VOD servers 340 using such a network. In such a case, the promotion information is read from the database 210 by the scheduler 240 which then creates customized transmission schedules that specify when each of the STBs 410 is to receive it. Upon receipt of the transmission schedule messages, the promotion agent 430 in each of the STBs 410 processes each schedule entry and waits for the delivery of each promotion identified in the transmission schedule. For further information concerning the use of a wide area network for the distribution of promotions, and a specific protocol and format for such promotion data, reference should be made to U.S. Provisional Patent Application Serial No. 60/253,369 filed Nov. 28, 2000, entitled "Synchronization of Bulk Data Transfers To End Node Devices In A Multimedia Network" which is hereby incorporated by reference in its entirety.

2. Process for Delivery of Promotion Content Using Video-on-Demand Channel

Figure 2:
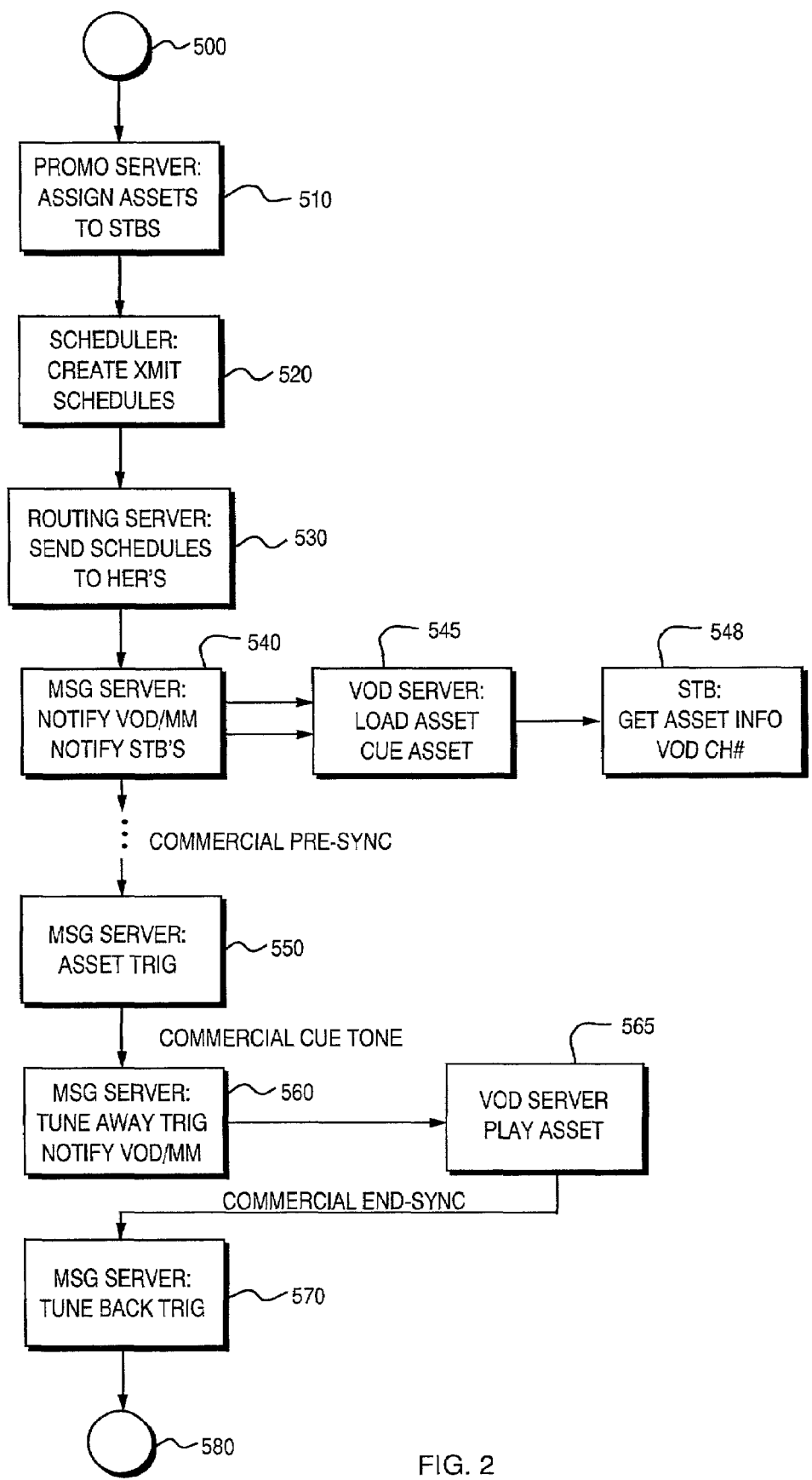
FIG. 2 is a process flow diagram illustrating how the various elements and processes in the system deliver the promotion.

Turning attention now to FIG. 2, a preferred embodiment of the process for delivery of targeted promotion content will be described. Initially the system is in a idle state 500.

Moving to step 510, the promotion server 220 assigns promotion assets to specific STBs 410, storing this information in the data base server 210.

Next, in step 520, the scheduler 240 determines that promotions are in need of distribution, and reads the information in the database 210 to create individual transmission schedules. From the schedules are built a list of promotion schedule messages. A promotion schedule message is typically created for each instantiation of an expected playback of a promotion at a particular STB 410. The schedule message contains payload fields identifying a promotion, the network address or other identifier of the individual STB which is to receive the promotion, and an expected time by which the promotion is to be delivered.

In step 530 the routing server 230 routes the schedule messages out over the data network 275 to the intended head end 300 via the routers 250 and 310.

Following that, in step 540 a particular schedule message arrives at the message server 320. The message server in turn sends a message to its associated local VOD/media server 340 that a promotion is to be sent.

In step 545, this causes the VOD/media server 340 to load the identified asset, and cue the asset for playback, but without actually starting the playback at this time. The VOD takes other steps at this time, such as to identify a VOD channel number on which the asset will be played, back to the message server 320.

At this point, in step 548, the message server 320 also communicates with the specific STB 410 indicated in the schedule message. This message may include information about the asset such as an identifier which the promotion agent 430 in the STB may use to record the fact that it was played. This message is sent over the OOB/IB data path to the STB 410 as previously described.

After some period of time, a state 550 is entered which occurs a short time before a commercial break. In this state the message server causes an asset trigger to be inserted in the broadcast stream. This trigger, which may typically be sent in the Vertical Blanking Interval (VBI) as defined in the ATVEF specification, or in other ways. For example, the trigger may be placed in the private data sements of an MPEG stream, if the VOD content is so formatted. In any event, the asset trigger contains text character, or other data indicating general information identifying the upcoming promotion, and a VOD channel number on which it will be played.

Next, a commercial cue is detected in the broadcast signal at the head end 300 as output by a digital ad insertion system typically located at the insertion location in the broadcast network. Since only a few VOD channels will be used for the purpose of distributing promotions, the handful of such channels used for this purpose can be monitored at the head end for such tones. Detection of commercial cue causes a tune away trigger to be sent, in step 560, from the head end 300 to the STB 410.

In turn, receipt of the tune away trigger causes the promotion agent 430 in the STB 410 to switch to the indicated VOD channel. At the same time, the message server 320 at the head end signals the VOD/media server 340 to begin playback of the promotion.

The STB may include circuits that blank an undesireable "pixelation" effect that may occur during channel switchover to the VOD channel. Alternatively, other information such as channel information is displayed during switchover to the VOD channel.

The promotion is then viewed at the STB 410 in state 565, until a commercial end tone is detected. At this point, in state 570, the message server 320 instructs the promotion agent 430 in the STB 410 to return to the original broadcast channel, such as by sending another tune back trigger.

What is claimed is:

1. In a cable television network system that connects set-top boxes (STBs) to receive video broadcast program content from cable network head end distribution points via a cable network, a method for delivery of a promotional content stream to the STBs, the system further comprising a promotion server subsystem that includes a promotion scheduler, a message routing server, and one or more message routers located at a central location, head ends comprising a head end router, a head end message server, a trigger inserter, a Video on Demand (VOD) streaming server, and Radio Frequency (RF) distribution equipment for distributing broadcast signals to the STBs, the head end message server connected to the message routing server via a data network, the method comprising the steps of:

at the promotion server subsystem,
  assigning a promotion asset to a list of specific STBs that are expected to receive the promotion asset;
  creating a promotion schedule message (PSM) for each promotion and each particular STB scheduled to view that promotion, such that a PSM is created for each instance of a promotion to be viewed at a specific STB, each PSM indicating an identifier of the promotion, the specific STB, and a time by which the promotion is to be viewed on the STB;
  sending the PSMs to the head ends via the data network;
at the head end message server,
  receiving a PSM;
  sending a message to the VOD server, the message requesting playback of the promotion;
  receiving, from the VOD server, an indication of a VOD channel number on which the indicated promotion will be played;
  sending a plurality of messages to the specific STBs associated with the promotion, the message including an identifier for the promotion to be returned to the head end message server after the promotion is played back at the STB, but the message not indicating a VOD channel number;
  at a later time, inserting an asset trigger in a broadcast signal sent to the STBs, the asset trigger indicating an identifier for the promotion and a VOD channel number, but the asset trigger not yet causing playback of the promotion;
  at a still later time, detecting a commercial cue in a broadcast signal as received from a broadcast network, and in response thereto, sending a tune away trigger to the STBs;
at the STB,
upon receipt of the tune away trigger, tuning to the VOD channel that was indicated in the asset trigger, to cause the promotion to be displayed.

2. A method as in claim 1 additionally comprising:
at the head end,
  detecting a commercial end tone signal; and
  sending a tune back trigger to the STBs;
at the STBs,
  receiving a tune back trigger from the head end, indicating that playback of the promotion is complete.

3. A method as in claim 2 additionally comprising:
after receiving the tune back trigger, reporting the identifier of the promotion to the head end server.

* * * * *